United States Patent [19]

Rogers et al.

[11] Patent Number: 4,628,125
[45] Date of Patent: Dec. 9, 1986

[54] MONOMERS CONTAINING BIS(TRIFLUOROMETHYL)BIPHENYLENE RADICALS

[75] Inventors: Howard G. Rogers, Weston, Mass.; Russell A. Gaudiana, Merrimack, N.H.; Richard A. Minns, Arlington, Mass.

[73] Assignee: Polaroid Corporation, Patent Dept., Cambridge, Mass.

[21] Appl. No.: 578,694

[22] Filed: Feb. 9, 1984

Related U.S. Application Data

[62] Division of Ser. No. 414,473, Sep. 2, 1982, Pat. No. 4,433,132.

[51] Int. Cl.$^4$ .............................................. C07C 39/15
[52] U.S. Cl. ................................ 568/730; 260/544 D; 260/544 F; 528/191; 560/59; 560/83; 562/474; 562/488
[58] Field of Search ....................... 260/544 F, 544 D; 560/59, 83; 562/474, 488; 568/730

[56] References Cited

U.S. PATENT DOCUMENTS

| | | | |
|---|---|---|---|
| 3,786,022 | 1/1974 | Hata et al. | 528/191 |
| 4,083,829 | 4/1978 | Calundann et al. | 528/191 |
| 4,384,107 | 5/1983 | Rogers et al. | 528/183 |
| 4,393,194 | 7/1983 | Gaudiana et al. | 528/348 |

OTHER PUBLICATIONS

Dey et al, *Chemical Abstracts*, 82:25679j (1975) abstracting *J. Med. Chem.*, 1974, 17(10), 1095-1100.

Primary Examiner—Natalie Trousof
Assistant Examiner—Vera C. Clarke
Attorney, Agent, or Firm—Louis G. Xiarhos

[57] ABSTRACT

A class of polyesters comprising recurring units having certain bis(trifluoromethyl)biphenylene radicals is disclosed. The polyesters exhibit favorable solubility properties in certain organic solvents so as to facilitate the production of the polyesters via polycondensation methods to film- and fiber-forming molecular weights. Monomeric compounds comprising a bis(trifluoromethyl)biphenylene radical and useful for the production of the polyesters are also disclosed.

1 Claim, No Drawings

MONOMERS CONTAINING BIS(TRIFLUOROMETHYL)BIPHENYLENE RADICALS

This is a division of application Ser. No. 414,473, filed Sept. 2, 1982, now U.S. Pat. No. 4,433,132.

BACKGROUND OF THE INVENTION

This invention relates to certain aromatic polyesters exhibiting desirable solubility characteristics and useful in the production of films and fibers. More particularly, it relates to aromatic polyesters containing recurring 2,2'-bis(trifluoromethyl)-4,4'-biphenylene radicals and to monomeric compounds useful in the production of such polyesters.

The production of polyesters, including aromatic polyesters, by the polycondensation of dicarboxylic acids (or the corresponding acyl halides) and polyhydric alcohols has been well known. For example, the production of such polyesters is described in U.S. Pat. No. 3,008,929 (issued Nov. 14, 1961 to E. A. Wielicki); in U.S. Pat. No. 3,786,022 (issued Jan. 15, 1974 to N. Hata et al.); in U.S. Pat. No. 4,066,620 (issued Jan. 3, 1978 to J. J. Kleinschuster); in U.S. Pat. No. 4,083,829 (issued Apr. 11, 1978 to G. W. Calundann et al.); and in U.S. Pat. No. 4,288,588 (issued Sept. 8, 1981 to J. A. Donohue). In general, it is well recognized that the mechanical and physical properties of polymeric films and fibers will depend upon the chemical structure of the polymers from which they are prepared and that such properties can be materially influenced by such molecular factors as chain stiffness, intermolecular forces, orientation and crystallinity. Accordingly, there has been considerable interest in the development of polyesters having particular structural or molecular configurations for the realization of one or more particular properties suited to a desired application.

In the production of polyester films and fibers, it will oftentimes be advantageous to prepare such films and fibers from a solution of the polyester in a common and readily available solvent material. Frequently, and particularly in the case of wholly aromatic polyesters, the polyester materials may be substantially insoluble. Moreover, the insolubility of the polyester may represent a limitation on the attainment of film- and fiber-forming molecular weights owing to the tendency of the polyester to precipitate from a solution polycondensation medium without attaining the requisite molecular weight for such film or fiber formation. Accordingly, the characteristic and advantageous properties of a polyester suited to a particular application will be more readily realized where the polyester material exhibits solubility in readily available organic solvents and can be polymerized to film- and fiber-forming molecular weights in such solvents.

SUMMARY OF THE INVENTION

The present invention provides a class of polymeric materials exhibiting solubility in common organic solvents, such as in dimethylacetamide or tetrahydrofuran, and is based in part upon the discovery that the incorporation into a polyester of recurring 2,2'-bis(trifluoromethyl)-4,4'-biphenylene radicals imparts to the polyester material certain desired solubility characteristics which facilitate the formation of the polyester by solution polycondensation and the production of films and fibers. Transparent films and fibers exhibiting certain optical properties, e.g., birefringence, can be provided. The present invention, thus, provides a class of polymers comprising recurring units of the formula

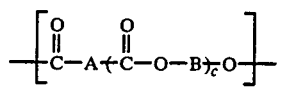

FORMULA I wherein each of A and B is a divalent organic radical and C is zero or one; and wherein, when c is one, at least one of said A and B divalent radicals is a 2,2'-bis(trifluoromethyl) biphenylene radical having the formula

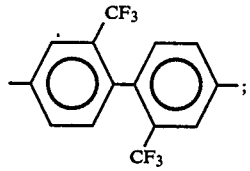

FORMULA II and wherein, when c is zero, said divalent radical A is a 2,2'-bis(trifluoromethyl)biphenylene radical having the aforesaid formula.

According to another composition aspect of the present invention there is provided a novel class of monomers of the formula

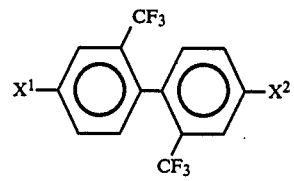

FORMULA III wherein each of $X^1$ and $X^2$ is independently —OH; or

where Z is halogen or —OR, and R is hydrogen or alkyl. The novel monomers are useful in the production of the novel polymers of the present invention.

DETAILED DESCRIPTION OF THE INVENTION

As described hereinbefore, the polyesters of the present invention comprise recurring units of the formula

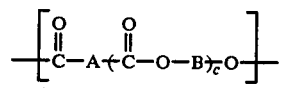

FORMULA I wherein c is zero or one. It will be appreciated from inspection of Formula I that the following recurring units are contemplated when c is the integer one:

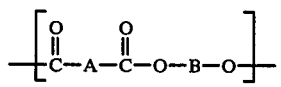

Formula IV

In such recurring units, at least one of divalent radicals A and B will comprise a 2,2'-bis(trifluoromethyl)-4,4'-biphenylene radical having the formula

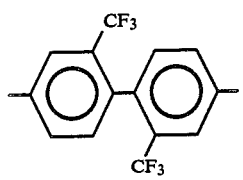

FORMULA II

For purposes of convenience, the 2,2'-bis(trifluoromethyl)4,4'-biphenylene radical of Formula II, and any such radical containing additional substituent groups, is referred to hereinafter as a bis(trifluoromethyl) biphenylene radical.

While applicants do not wish to be bound by precise theory or mechanism in explanation of the solubility properties observed in polyesters containing a bis(trifluoromethyl) biphenylene radical, it is believed that the solubility of such polyesters is importantly related to the presence of trifluoromethyl groups at the ortho positions of the inter-bonded aromatic nuclei of a bis(trifluoromethyl) biphenylene radical. The large steric effects of the trifluoromethyl substituents are believed to confer or promote a condition of non-coplanarity with respect to the aromatic nuclei thereof, i.e., a molecular configuration whereby the trifluoromethyl-substituted interbonded aromatic nuclei are in different planes. The presence of such nuclei or rings in "twisted" configuration relative to one another is also believed to provide a distribution of high electron density cylindrically or ellipsoidally about the long axis of a recurring unit containing the bis(trifluoromethyl)-biphenylene radical and a rigid rod-like oriented polymer resulting from the end-to-end joining of such recurring units. This distribution is believed to contribute at least in part to optical anisotropy or birefringence in such rigid rod-like polymers.

When only one of radicals A and B in the recurring unit

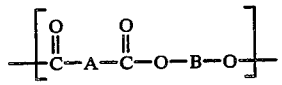

FORMULA IV is a bis(trifluoromethyl) biphenylene radical, the remaining divalent radical A or B can comprise any of a variety of divalent organic radicals so long as the solubility-promoting influence of the bis(trifluoromethyl) biphenylene radical is not effectively negated in the resulting polyester. In general, where only one of the A and B organic divalent radicals is a bis(trifluoromethyl) biphenylene radical, the other or remaining A or B radical can be a divalent aliphatic or aromatic moiety. For example, the aliphatic radical can be an alkylene radical having from 2 to about 12 or more carbon atoms in the alkylene chain and can be branched or unbranched. The alkylene radicals derived from such polyhydric alcohols as ethylene glycol, 1,2-propylene glycol, 1,3-propylene glycol, butylene glycol, hexamethylene glycol or the like are exemplary of such alkylene radicals.

Suitable aromatic divalent radicals include those having at least one benzene ring, i.e., a six-carbon benzene ring, a fused aromatic radical such as naphthylene, or a radical comprising interbonded phenylene rings such as biphenylene. The aromatic divalent radicals can also include those where the aromatic nuclei are interbonded through a divalent moiety such as a methylene, ether, sulfide or sulfone moiety. Examples of such radicals are the diphenylene ether, diphenylenemethane, diphenylenesulfide and diphenylenesulfone radicals. It will be appreciated that such aliphatic or aromatic divalent radicals can be substituted, for example, by alkyl, halogen or other substituent moieties. A preferred substituted aromatic radical is the 2-chloro-1,4'-phenylene radical.

When only one of the A or B radicals in the recurring unit of Formula IV is a bis(trifluoromethyl)biphenylene radical, the nature of the remaining A or B radical will be determined largely by the particular properties desired in the polyester. For example, it may be desired to utilize the polyester as a birefringent layer in an optical device, in which case, the remaining radical A or B will be a radical which confers a rigid rod-like character to the polyester resulting from a recurring unit of Formula IV. In general, the remaining A or B radical will in this case be a divalent radical having essentially coaxial chain-extending bonds. For example, aromatic radicals having para-oriented chain-extending bonds will be suited to the provision of polymers having a rigid rod-like character. Radicals having a flexible character such as alkylene radicals and biphenyl radicals interbonded through methylene, ether, sulfone, sulfide or like group will not be suitable where a rigid rod-like polymer is desired. Suitable divalent radicals having essentially coaxial chain-extending bonds and suited as the remaining A or B radical for the production of rigid rod-like polymers include such radical as 1,4-phenylene; 2-chloro-1,4-phenylene; 4,4'-biphenylene; substituted, e.g., halo-substituted 4,4'-biphenylene radicals; a stilbene radical such as

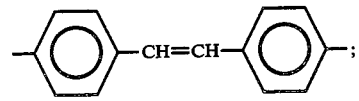

and corresponding substituted, e.g., chloro- or bromo-substituted stilbene radicals. Also suitable are trans-vinylene; ethynlene; and polyunsaturated divalent radicals conforming to the formula

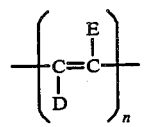

where n is an integer of at least two (e.g., two or three) and each of D and E is hydrogen or alkyl (e.g., methyl) and inclusive of such polyunsaturated divalent radicals as trans-trans-1,4-butadienylene, i.e.,

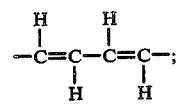

and 1,4-dimethyl-trans-trans-1,4-butadienylene, i.e.,

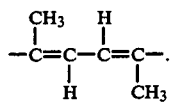

Other suitable radicals for this purpose are disclosed in the U.S. patent application of H. G. Rogers et al., Ser. No. 238,069, filed Mar. 2, 1981, and now U.S. Pat. No. 4,384,107 and; in the U.S. patent application of H. G. Rogers et al., Ser. No. 238,054, filed Mar. 2, 1981, and now U.S. Pat. No. 4,446,305.

Where the optical properties of a polyester hereof are not of paramount importance to a particular application, considerable latitude in the nature of the remaining A or B radical will be permitted where only one of the A or B radicals is a bis(trifluoromethyl)biphenylene radical hereof. For example, where the polyester is to be used as a plasticizer for other polymers, or for the production of certain fibers or films where birefringence, refractive or like optical properties are not required, radicals such as 1,3-phenylene as can be derived from isophthalic acid, and radicals such as alkylene or biphenyl radicals interbonded through a methylene, ether, sulfone or like linkage, can be utilized.

Inclusive of polyesters of the present invention represented by the structure of Formula IV are those containing recurring units represented by the following structures. It will be appreciated that one or more hydrogen atoms of each aromatic nucleus of the 2,2'-bis(-trifluoromethyl) -4,4'-biphenylene radical can, if desired, be replaced with a substituent group such as alkyl, halo (e.g., chloro, bromo, iodo, fluoro), nitro or the like.

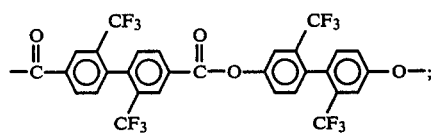 FORMULA V

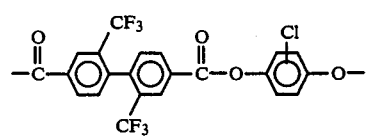 FORMULA VI

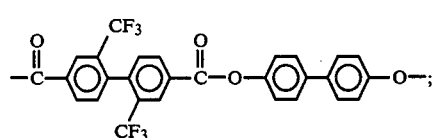 FORMULA VII

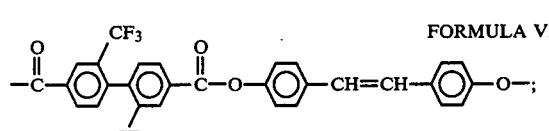 FORMULA VIII

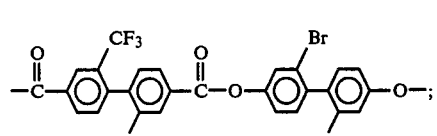 FORMULA IX

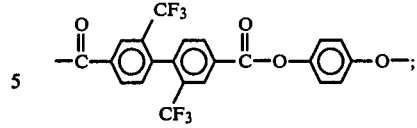 FORMULA X

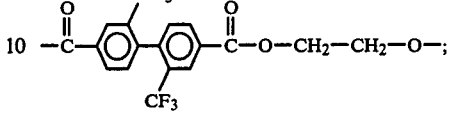 FORMULA XI

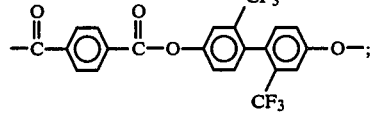 FORMULA XII

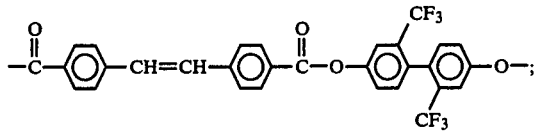 FORMULA XIII

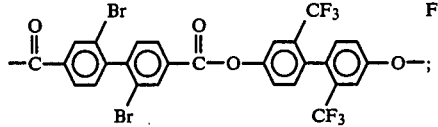 FORMULA XIV

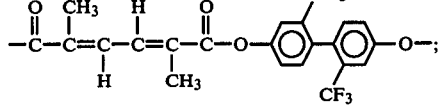 FORMULA XV

From inspection of the general formula set forth as descriptive of recurring units of the polyesters hereof, i.e., recurring units of the formula

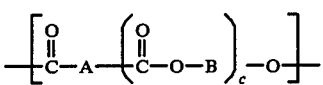 FORMULA I it will be appreciated that, when c is zero, the recurring unit will be represented by the following formula:

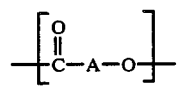 FORMULA XVI wherein A is a bis(trifluoromethyl) biphenylene radical as hereinbefore described. Accordingly, such a polyester will be a polymer of a recurring unit as follows which contains a bis(trifluoromethyl)biphenylene radical:

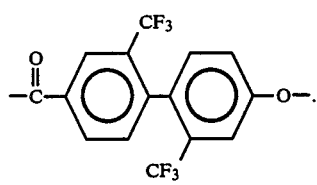

While the polyesters described hereinbefore can consist essentially of recurring units represented by the structures of Formulas IV and XVI, i.e.,

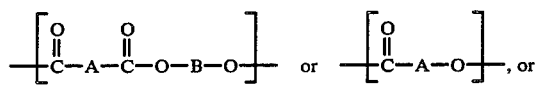

a combination of such recurring units, the polyesters hereof can also comprise recurring units not conforming to the described structures of Formulas IV and XVI. Examples of recurring units which do not conform to such descriptions and which can be present in such polyesters in proportions which do not undesirably reduce the solubility of the polymeric material include, for example, recurring units having the formula

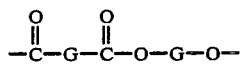

wherein each G is a divalent radical other than a bis(trifluoromethyl) biphenyl radical such as 1,4-phenylene; 4,4'-biphenylene; vinylene; trans,trans-1,4-dimethyl-trans,trans-1,4-butadienylene or 2,4'-trans-vinylenephenylene.

The polyesters of the present invention can be prepared by resort to a solution polycondensation or melt polycondensation reaction depending upon the melting point or solubility of the particular reactants employed. In general, the polyesters can be prepared by reaction of a dicarboxylic acid (or corresponding acid halide or alkyl ester) with a polyhydric alcohol according to generally known polycondensation methods. For example, polyesters of the type represented by the structure of Formula IV can be suitably prepared by the reaction of a dicarboxylic acid halide of the formula

with a polyhydric alcohol of the formula HO-B-OH, where Hal represents halogen, such as chloro or bromo, and A and B have the meanings set forth hereinbefore.

In the case, for example, of a solution polycondensation reaction, the polyester can be obtained by reaction of the diacid halide with the polyhydric alcohol in a suitable inert organic solvent and in the presence of a catalyst (or acid acceptor) which neutralizes hydrogen chloride formed, e.g., pyridine.

An inert organic solvent is utilized to dissolve the polyester produced by the polycondensation reaction. Suitable solvents include chloroform, methylene chloride, 1,2-dichloroethane, 1,1,2,2-tetrachloroethane, dimethylsulfoxide, N,N-dimethylformamide and acetone. In general, the polyester is obtained by reaction of one mole of the polyhydric alcohol (or a mixture of polyhydric alcohols) with 1.0 to 1.05 moles of the diacid halide in the organic solvent and in the presence of at least two moles of the acid acceptor. The polycondensation can be conducted at a temperature of about 20° C. to about 150° C. or higher depending upon the boiling point of the solvent. Suitable acid acceptors include the tertiary amines, such as the trialkyl amines, e.g., trimethylamine; or heterocyclic amines, e.g., pyridine.

The polyesters hereof can also be prepared by a known melt polycondensation technique whereby one mole of a diacetate of the polyhydric alcohol is reacted with 1.0 to 1.1 moles of the dicarboxylic acid in the presence of a catalyst. The reaction mixture is heated in a stream of inert gas, e.g., nitrogen, to a reaction temperature between the melting temperature and the decomposition temperature of the monomers and the reaction pressure is reduced to below about 60 mm. Hg for removal of acetic acid produced by the reaction. Further heating above the melting temperature of the polyester product and reduction of the reaction pressure to below about 5 mm. Hg. results in additional removal of acetic acid by-product. Organometallic compounds such as titanium dioxide, antimony trioxide and butyl orthotitanate can be suitably employed as catalysts for the melt polycondensation reaction.

Polyesters of the present invention can also be prepared by an ester interchange according to generally known procedure. Thus, one mole of a dialkyl ester of the dicarboxylic acid can be reacted with from about 1.1 to about 2.5 moles of polyhydric alcohol, generally at atmospheric pressure, although subatmospheric or superatmospheric conditions can be employed. Suitable catalysts for the ester interchange reaction, which is generally conducted over a range of from about 90° C. to 325° C., include calcium acetate, sodium methoxide, antimony trioxide and tetraisopropyl titanate. During the ester interchange reaction, methanol is removed as a by-product and heating is continued to effect the polycondensation.

The preparation of polyesters hereof can be illustrated by the following reaction schemes: Reaction 1(a) involving the solution polycondensation of chlorohydroquinone and 2,2'-bis(trifluoromethyl)-4,4'-biphenyl dicarbonyl chloride in 1,1,2,2-tetrachloroethane (TCE) solvent using pyridine as an acid acceptor; and Reaction 1(b) involving the high-temperature ester interchange melt polycondensation of ethylene glycol and dimethyl 2,2'-bis(trifluoromethyl)-4,4'-biphenyl dicarboxylate using calcium acetate and antimony trioxide as transesterification catalysts.

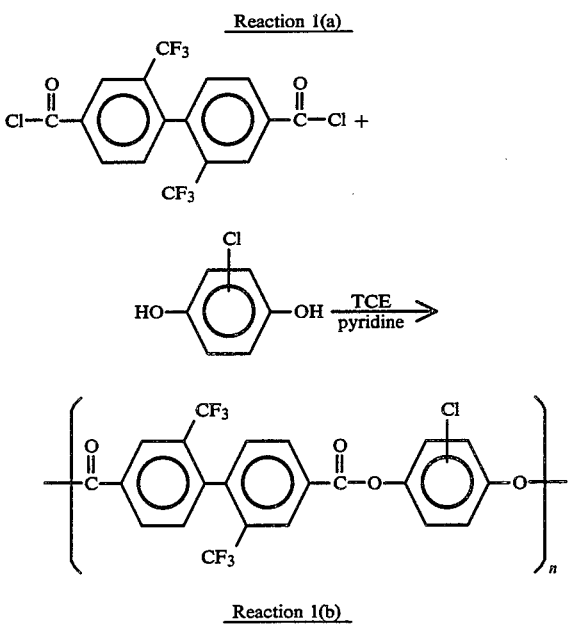

-continued

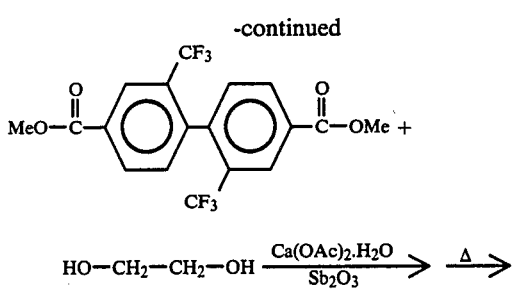

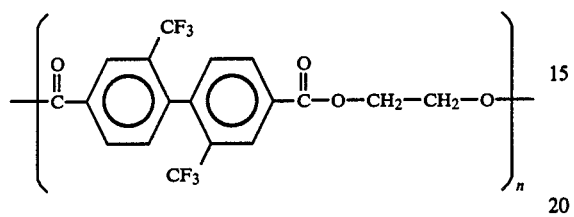

Polyesters containing recurring units having the structure represented by Formula XVI, i.e.,

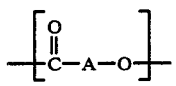

can be prepared, for example by the polymerization of 2,2'-bis(trifluoromethyl)-4-hydroxy-4'-biphenyl carboxylic acid with the aid of an esterification catalyst or by employing a carbonyl halide thereof and an acid acceptor. This polymerization is illustrated by reference to the preparation of poly-(2,2'-bis(trifluoromethyl)-4,4'-carboxylate in accordance with the following reaction scheme:

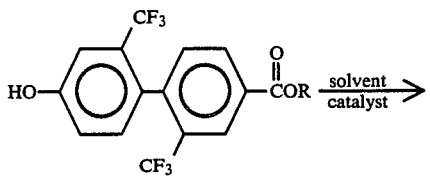

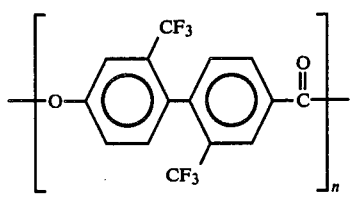

The polyesters of the present invention are conviently prepared from certain novel monomeric compounds of Formula III, i.e., compounds having the formula

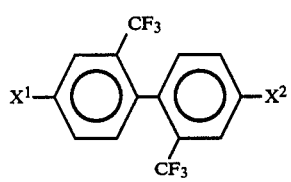

FORMULA III wherein each of $X^1$ and $X^2$ is independently —OH; or

where Z is halogen (e.g., chloro, bromo) or —OR, and R is hydrogen or is alkyl (e.g., methyl, ethyl, octyl). It will be seen that $X^1$ and $X^2$ can be the same (e.g., both —COOH) or different (e.g., $X^1$ is —COOH and $X^2$ is —OH).

Preferred monomeric compounds exemplary of the compounds of Formula III include the following:

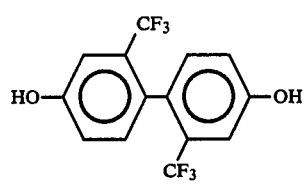

FORMULA XVII

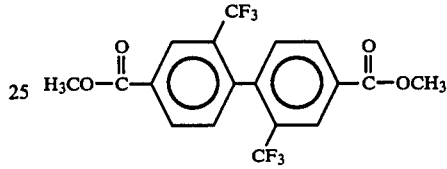

FORMULA XVIII

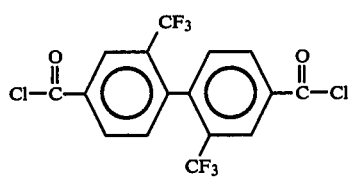

FORMULA XIX

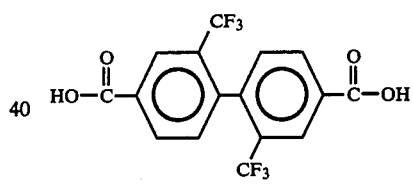

FORMULA XX

The monomeric compound of Formula XVII, i.e., 2,2'-bis(trifluoromethyl)-4,4'-dihydroxybiphenyl, can be prepared from a known starting material, i.e., 2,2'-bis(trifluoromethyl)-benzidine (reported by M. R. Pettit and J. C. Tatlow, J. Chem. Soc , 1951, pp. 3459-3464; and by R. A. Cartwright and J. C. Tatlow, J. Chem. Soc., 1953, pp. 1994-1998). This starting material can be converted to a tetrazonium tetrafluoroborate using sodium nitrite and tetrafluoroboric acid which can then be decomposed in refluxing trifluoroacetic acid containing potassium trifluoroacetate according to the procedure reported by D. E. Horning, D. A. Ross and J. M. Muchowski, Can. J. Chem., 51, 2347 (1973). The preparation of the compound of Formula XVII is illustrated by the following reaction scheme:

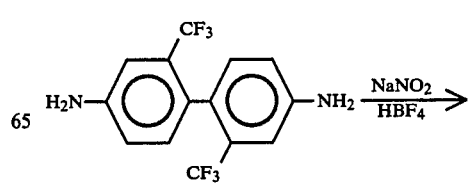

-continued

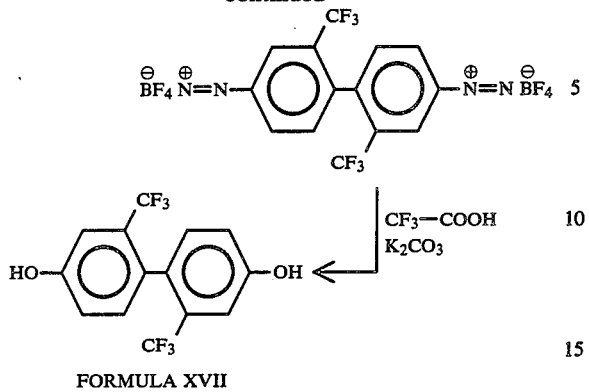

FORMULA XVII

The monomeric compound of Formula XVIII, i.e., dimethyl 2,2'-bis(trifluoromethyl)-4,4'-biphenyl dicarboxylate, can be prepared starting from 2,2'-bis(trifluoromethyl)-benzidine by (a) conversion to the tetrazonium salt using sodium nitrite and acid, e.g., sulfuric acid and conversion of the tetrazonium salt to 2,2'-bis(-trifluoromethyl)-4,4'-diiodobiphenyl by reaction in a solution of sodium iodide and iodine; and (b) carboalkoxylation of the diiodo compound using, for example, carbon monoxide in methanol and triethylamine with 2 mole % dichlorobis(triphenylphosphine) palladium (II) according to the procedure of A. Schoenberg, I. Bartoletti and R. F. Heck J. Org. Chem., 39, 3318 (1974). The production of the compound of Formula XVIII is illustrated by the following reaction scheme:

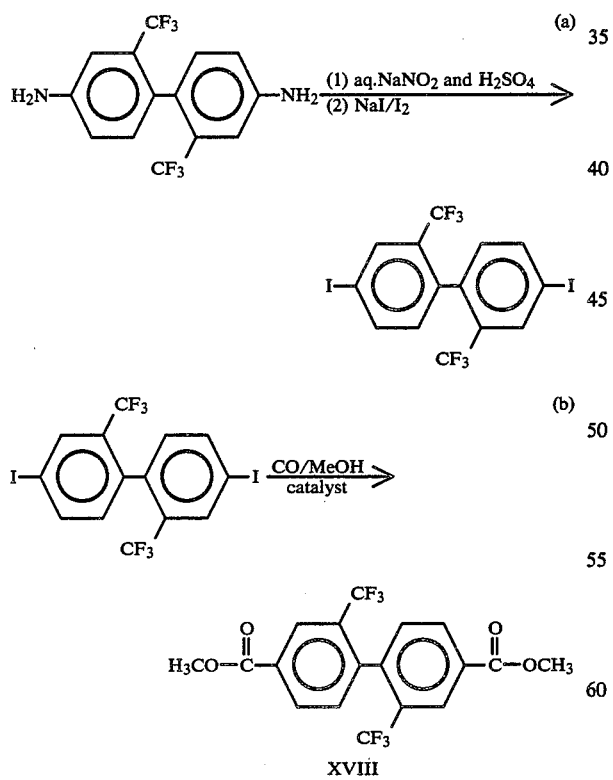

The dicarboxylate of Formula XVIII can be utilized to prepare other monomeric compounds of the invention. For example, saponification of the dicarboxylate using sodium hydroxide and acidification of the resulting salt provides the corresponding diacid of formula XX according to the following reaction scheme:

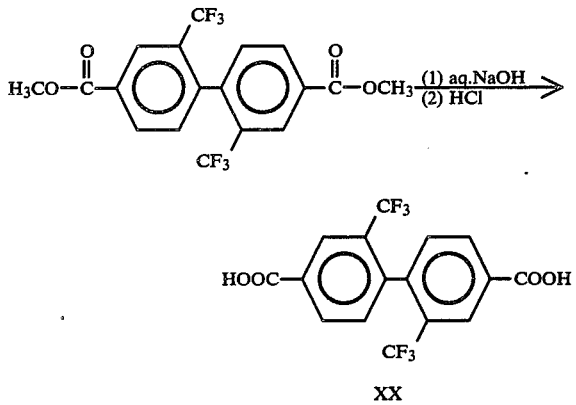

The acid dichloride corresponding to the diacid of Formula XX, i.e., 2,2'-bis(trifluoromethyl)-4,4'-biphenyl dicarbonyl chloride (Formula XIX) can be prepared by the known reaction of the acid with thionyl chloride:

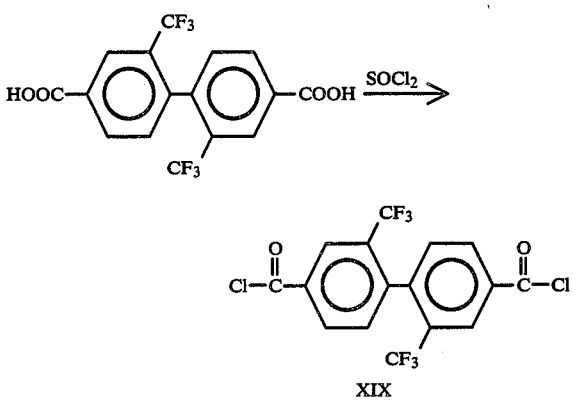

The polyesters of the present invention are especially advantageous from the standpoint of their solubility in such common and readily available solvents as tetrahydrofuran and dimethylacetamide. The improved solubility of the bis(trifluoromethyl)biphenylene polyesters of the invention, relative to wholly aromatic polyesters in general, permits improved handling of the polymers and facilitates the production of polymeric layers which can be coated from a suitable solvent material and made to conform to a desired shape or conformation suited to a particular application. Films and coated or other shaped forms of the polyesters can be redissolved and reshaped or refabricated if desired. Depending upon the nature of other recurring units as may be present in the polyester materials, and the nature of the solvent desirably employed, the solubility characteristics of the polyesters hereof can be varied or controlled to suit particular applications.

In general, and as reported in U.S. Pat. No. 4,083,829 (issued Apr. 1, 1978 to G. W. Calundann et al.), wholly aromatic polyesters tend to be substantially insoluble in common polyester solvents such as hexafluoroisopropanol and o-chlorophenol and are generally not susceptible to solution processing. The incorporation of trifluoromethyl substituent groups into wholly aromatic polyesters, e.g., into polyesters comprising recurring units of Formula IV wherein both A and B divalent radicals are aromatic radicals, thus, permits the realization of solubility and solution processing that otherwise may not be available.

The polyesters of the present invention can be variously formed or shaped into films, sheets, coatings, layers, fibrils, fibers or the like. For example, a solution of polyester as described hereinbefore, in a solvent material such as tetrahydrofuran can be readily cast onto a suitable support material for the formation of a polymeric film or layer of the polyester material. The polymeric film can be utilized for the production of a birefringent polymeric film or sheet material which can be utilized in various optical devices. Thus, a polymeric film or sheet material can be subjected to stretching so as to introduce molecular orientation and provide a film material having a birefringent character.

The polyesters of the present invention can also be formed into fibers, fibrils or the like by extrusion or spinning methods known in the art. Thus, for example, a solution of the polyester can be extruded or spun into a coagulating bath for coagulation of the polymeric material into the form of fibers which can be cut, stretched or assembled into fiber tows or bundles as desired. The fibers, fibrils, tows or the like can be washed for removal of residual solubilizing agents, solvents, extruding or spinning aids and dried to materials exhibiting birefringent and other desired properties.

Where a molecular orientation is permanently induced in the polyester material, as by formation of the polyester into an oriented sheet, fiber or other form, the polyester will exhibit optical birefringence which can be measured in accordance with a number of known methods. Known shaping or forming methods can be utilized for the orientation of polymeric materials of the present invention. Preferably, this will be accomplished by unidirectional stretching of a polymeric film, by extrusion of the polymer into a sheet, layer or other stretched form, or by the combined effects of extrusion and stretching. In their oriented state, the polymers of the invention exhibit birefringence and, in general, greater birefringence will be observed in the case of polymeric materials exhibiting a greater degree of molecular orientation.

The polymeric materials of the present invention, in addition to exhibiting desired solubility, are advantageous from the standpoint of their transparency. In contrast to polymeric materials which become decidedly opaque as a result of stretching, the polyesters hereof in general exhibit optical transparency in unoriented and stretched forms. For example, the polyesters hereof exhibit a high transparency and a low order of light scattering, exhibiting a ratio of amorphous to crystalline material of from about 10:1 to about 20:1 by weight. These materials are, thus, suited to optical applications where a light-transmissive material is desirably utilized.

The polyesters of the present invention can be utilized in the construction of a variety of optical filter or other devices. In general, such devices are multilayer devices which include a layer of molecularly oriented and birefringent polymeric material and, in addition, at least one other layer of isotropic or birefringent material. The polyesters of the invention exhibit birefringence and can be suitably employed in the construction of such devices. The additional layer or layers of such devices, whether isotropic or birefringent, will generally comprise materials having an index of refraction matching substantially one index of refraction of the birefringent polymeric material of the invention. For example, a layer of isotropic material having an index of refraction matching substantially one index of refraction of the birefringent layer can be suitably bonded to the layer of highly birefringent polymer. A preferred device comprises a layer of the molecularly oriented and birefringent material of the invention bonded between two layers of isotropic material, the index of refraction of each isotropic layer constituting substantially a match with an index of refraction of the molecularly oriented and birefringent material. Such a preferred device can be utilized for the polarization of light and may be termed a "total transmission" light polarizer, i.e., one which is particularly adapted to polarize a very large portion of incident light. Total polarizers find application in equipment such as may be employed for signaling, projection and display purposes, or the like, and in antiglare systems for automotive vehicles.

According to another application of the polymeric materials of the present invention, a plurality of alternating isotropic and birefringent layers can be utilized for the production of a multilayer light polarizing device, at least one of the layers of birefringent material comprising a molecularly oriented and highly birefringent material as defined herein. Such a device can be utilized as a multilayer polarizer which partly transmits and partly reflects incident light as separate linearly polarized components vibrating in orthogonal directions.

Optical devices in which the polyesters of the invention can be utilized, and their methods for construction and modes of operation are described in detail in the aforementioned U.S. patent application of H. G. Rogers et al., (U.S. Ser. No. 238,054, filed Mar. 2, 1981, and now U.S. Pat. No. 4,446,305). Examples of other devices which can be adapted to include a polymeric and birefringent layer as described herein are described, for example, in U.S. Pat. No. 3,506,333 (issued Apr. 14, 1970 to E. H. Land; in U.S. Pat. No. 3,213,753 (issued Oct. 26, 1965 to H. G. Rogers); in U.S. Pat. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to H. G. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The following non-limiting examples are illustrative of the present invention. All percentages are by weight except as otherwise indicated.

EXAMPLE 1

This Example illustrates the preparation of 2,2'-bis(trifluoromethyl)-4,4'-dihydroxybiphenyl.

A 48% (by weight) aqueous solution of tetrafluoroboric acid (6.7 ml.) was added to 10 mls. of water and 3.2 grams (0.01 mole) of 2,2'-bis(trifluoromethyl)-benzidine were dissolved therein. The resulting solution was cooled to 0° C. and a solution of 1.4 grams sodium nitrite (0.02 mole) in 3 mls. water was added dropwise with stirring over a ten-minute period. The resulting paste was stirred for ten minutes at 0° C. and was filtered. The product, white tetrazonium salt, was washed with ice-cold 10% aqueous tetrafluoroboric acid (ten mls.), ice-cold methanol (ten mls.) and ether and was then dried under vacuum at room temperature to yield 4.98 grams (96%) of salt product.

The salt as prepared above was added to a solution of anhydrous potassium carbonate (1.4 grams; 0.01 mole) in trifluoroacetic acid (50 mls.) in a three-necked round bottom flask equipped with a magnetic stirrer, reflux condenser and a supply of nitrogen gas. The solution was stirred under nitrogen at reflux temperature until it gave a negative test for tetrazonium salt (alkaline β-naphthol, two days). Excess trifluoroacetic acid was then evaporated and the residue was dissolved in 5% aqueous sodium hydroxide (150 mls.). Some insoluble potassium tetrafluoroborate was removed by filtration and the filtrate was washed two times with ether (50 mls. each time), was acidified in the cold with concentrated hydrochloric acid and was extracted three times with ether (3×50 mls.). The combined extracts were dried over sodium sulfate and evaporated to an oil. Flash chromatography over silica gel with 1% ether in methylene dichloride yielded a yellow oil which slowly crystallized. The solid was triturated under pentane, filtered and dried to yield 1.8 grams (57%) of pale yellow solid having a melting point of 152°-152.5° C. Two sublimations at 125° C. (<5 microns) failed to remove all of the yellow color or to change the melting point.

Elemental analysis for $C_{14}H_8F_6O_2$ provided the following:

|  | % C | % H | % F |
|---|---|---|---|
| Calculated: | 52.19 | 2.50 | 35.38 |
| Found: | 51.89 | 2.74 | 35.17 |

The structure of the product, i.e., 2,2'-bis(trifluoromethyl)-4,4'-dihydroxybiphenyl having the structure shown in Formula XVII was confirmed by nuclear magnetic resonance (NMR) and infrared (IR) spectrophotometric analyses.

EXAMPLE 2

This Example illustrates the preparation of dimethyl 2,2'-bis(trifluoromethyl)-4,4'-biphenyl dicarboxylate.

Part A.—Preparation of 2,2'-bis(trifluoromethyl)-4,4'-diiodobiphenyl

Ten grams of 2,2'-bis(trifluoromethyl)-benzidine (0.0312 mole) were dissolved in water (100 mls.) and concentrated sulfuric acid (60 mls.) and the solution was cooled to 0° C. A solution of sodium nitrite (4.5 grams; 0.0652 mole) in water (ten mls.) was added dropwise with stirring. The resulting cold tetrazonium salt solution was added slowly to a stirred solution of sodium iodide (20 grams) and iodine (20 grams) in water (20 mls.) maintained at a temperature of 0° C. During the addition, methylene dichloride was added to keep the product in solution. After stirring the mixture overnight at room temperature, excess iodine was destroyed by adding sodium bisulfite and the product was extracted with methylene dichloride. The organic phase was washed with aqueous sodium bisulfite, dried and evaporated to yield 13.3 grams (78%) of product, i.e., 2,2'-bis(trifluoromethyl)-4,4'-diiodobiphenyl, having a melting point of 119°-122° C. Recrystallization from methanol yielded white prisms having a melting point of 121°-123° C.

Elemental analysis for $C_{14}H_6F_6I_2$ provided the following

|  | % C | % H | % F | % I |
|---|---|---|---|---|
| Calculated: | 31.02 | 1.12 | 21.03 | 46.83 |
| Found: | 31.03 | 0.93 | 20.13 | 47.71 |

The structure of the product was confirmed by NMR and IR spectrophotometric analyses.

Part B. — Preparation of dimethyl 2,2'-bis(trifluoromethyl)-4,4'-biphenyl dicarboxylate Seven grams (0.0129 mole) of 2,2'-bis(trifluoromethyl)-4,4'-diiodobiphenyl, as prepared in Part A hereinbefore, 183 mgs. (0.00026 mole) of dichlorobis(triphenylphosphine) palladium (II), 5.5 mls. (0.039 mole) of triethylamine and 65 mls. of methanol were stirred at 55° C. under one atmosphere of carbon monoxide for 18 hours. The solvent was evaporated and the residue was dissolved in hexane, treated with Norit (activated carbon) and filtered in a Soxhlet extractor. Flash chromatography of the filtrate over silica gel with methylene dichloride/hexane: (1:1 by vol.) yielded an amber oil which was crystallized from methanol at −60° C. to yield 3.8 grams (73%) of white product having a melting point of 71°-72° C.

Elemental analysis for $C_{18}H_{12}F_6O_4$ provided the following:

|  | % C | % H | % F |
|---|---|---|---|
| Calculated: | 53.21 | 2.98 | 28.06 |
| Found: | 53.10 | 2.74 | 27.98 |

The structure of the product, i.e., dimethyl 2,2'-bis(trifluoromethyl)-4,4'-biphenyl dicarboxylate having the structure shown in Formula XVIII, was confirmed by NMR and IR analyses.

EXAMPLE 3

This Example illustrates the preparation of 2,2'-bis(-trifluoromethyl)-4,4'-biphenyl dicarboxylic acid.

Two grams (0.0049 mole) of dimethyl 2,2'-bis(trifluoromethyl)-4,4'-biphenyl dicarboxylate were dissolved in 20 mls. of methanol and four mls. of 50% by wt. aqueous sodium hydroxide. The solution was heated to boiling with stirring and 100 mls. of water were added over a one-hour period to maintain a clear solution as methanol was distilled off. When the vapor temperature reached 99° C., the solution was cooled and acidified with concentrated hydrochloric acid to yield a coarse precipitate which was filtered, washed with water and dried. The product, obtained in an amount of 1.77 grams (95%), had a melting point greater than 300° C.

The structure of the product, i.e., 2,2'-bis(trifluoromethyl)-4,4'-biphenyl dicarboxylic acid having the structure shown in Formula XX, was confirmed by NMR and IR spectrophotometric analyses.

EXAMPLE 4

This Example illustrates the preparation of 2,2'-bis(-trifluoromethyl)-4,4'-biphenyl dicarbonyl chloride.

A reaction mixture of 2.5 grams (0.0066 mole) 2,2'-bis(trifluoromethyl)-4,4'-biphenyl dicarboxylic acid, prepared as described in Example 3 hereof, 30 mls. of thionyl chloride and one drop dimethylformamide were stirred under reflux for four hours. Excess thionyl chloride was then distilled off and the residual oil was dissolved in pentane, filtered and blown dry with nitrogen to effect crystallization of the product. Drying in vacuo provided 2.6 grams (95%) of product exhibiting a melting point of 52°–54° C. Molecular distillation at 80°–100° C. (<5 microns) provided white crystals (2.3 grams, 84%) exhibiting a melting point of 55°–56° C.

Elemental analysis of the product for $C_{16}H_6Cl_2F_6O_2$ provided the following:

|  | % C | % H | % Cl | % F |
|---|---|---|---|---|
| Calculated: | 46.29 | 1.46 | 17.08 | 27.46 |
| Found: | 46.24 | 1.82 | 17.17 | 27.39 |

The structure of the product, i.e., 2,2'-bis(trifluoromethyl)-4,4'-biphenyl dicarbonyl chloride having the structure shown in Formula XIX, was confirmed by NMR and IR spectrophotometric analyses.

EXAMPLE 5

This Example illustrates the polycondensation of chlorohydroquinone and 2,2'-bis(trifluoromethyl)-4,4'-biphenyl dicarbonyl chloride, i.e., the preparation of poly(chloro-1",4"-phenylene 2,2'-bis(trifluoromethyl)-4,4'-biphenyl dicarboxylate).

Chlorohydroquinone (sublimed; 312 mgs.) was dissolved in 2.5 mls. of 1,1,2,2-tetrachloroethane (TCE) and 0.6 ml. of pyridine under an argon atomosphere. A solution of 896 mgs. of 2,2'-bis(trifluoromethyl)-4,4'-biphenyl dicarbonyl chloride in 2.5 mls. of TCE was then added dropwise by syringe with rapid magnetic stirring. The clear solution rapidly increased in viscosity stopping the stirrer in about five minutes. After standing at room temperature for three days, 75 mls. of methylene dichloride were added with stirring to provide a viscous solution. The polymer was precipitated in 800 mls. of methanol, filtered, washed with methanol and dried to yield 987 mgs. of white crumb-like product.

Elemental analysis for $C_{22}H_9ClF_6O_4$ provided the following:

|  | % C | % H | % Cl | % F |
|---|---|---|---|---|
| Calculated: | 54.29 | 1.86 | 7.28 | 23.42 |
| Found: | 53.97 | 1.89 | 7.00 | 23.02 |

The polymeric product, obtained in 94% yield, contained the following recurring structural units:

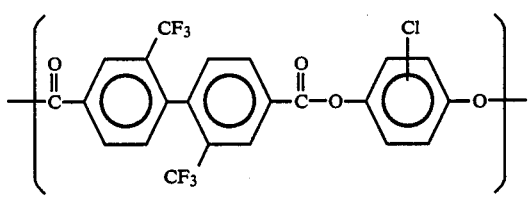

The polymer structure was confirmed by IR spectrophotometric analysis.

Upon heating of the polymer to 350° C. on a Fisher-Johns melting point apparatus, the polymer softened slightly but did not discolor. Thermogravimetric analysis showed that the onset of decomposition in nitrogen occurred at 500° C. Differential scanning calorimetry failed to detect any transitions up to 325° C. The polymer was soluble in methylene dichloride, chloroform, TCE, tetrahydrofuran, dioxane, dimethylacetamide and pyridine. The polymer was swollen by 1,2-dichloroethane, acetone, benzene, chlorobenzene and ethyl acetate and was insoluble in water, methanol and hexane.

The inherent viscosity (0.5 g./dl.) of the polymer in methylene dichloride and in tetrahydrofuran was in each case 4.8 dl./gram. The inherent viscosity of a solution of the polymer in lithium chloride and dimethylacetamide (0.5 gra of the polymer of this Example per 100 mls. of a solution of five grams LiCl per 100 mls. of DMAC) was 0.95 dl./gram. Films that were cast from TCE onto glass slides, allowed to dry at room temperature, soaked in methanol to free the film from the glass and then dried were relatively clear and exhibited a refractive index of 1.73. A stretched film exhibited parallel and perpendicular refractive indices, respectively, of 1.78 and 1.48.

EXAMPLE 6

This Example illustrates the polycondensation of 2,2'-bis(trifluoromethyl)biphenyl dicarbonyl chloride and 2,2'-bis(trifluoromethyl)-4,4'-dihydroxy biphenyl to provide poly(2"2"'-bis(trifluoromethyl)-4",4"'-biphenylene 2,2'-bis(trifluoromethyl)-4,4'-biphenyl dicarboxylate).

2,2'-bis(trifluoromethyl)-4,4'-dihydroxybiphenyl (388 xgs.) was dissolved in two mls. of TCE and 0.5 ml. of pyridine under an argon atmosphere. A solution of 500 mgs. of 2,2'-bis(trifluoromethyl)-4,4'-biphenyl dicarbonyl chloride in two mls. of TCE was added dropwise with stirring resulting in the formation of a white emulsion. Tetrahydrofuran (35 mls.) was slowly added to provide an almost-clear solution. Polymeric product was precipitated in methanol, filtered, washed with methanol and dried to yield 755 mgs. (94%) of a white polymeric material containing recurring units of the formula

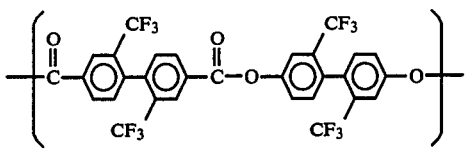

Elemental analysis for $C_{30}H_{12}F_{12}O_4$ provided the following:

|  | % C | % H | % F |
|---|---|---|---|
| Calculated: | 54.23 | 1.82 | 34.31 |
| Found: | 53.85 | 2.07 | 32.81 |

The polymer exhibited solubility in tetrahydrofuran and in dimethylacetamide. The polymer was not soluble in dichloromethane, acetone, methanol, hexane or water. When heated to 350° C. on a Fisher-Johns melting point apparatus, the polymer did not melt, flow or discolor. Inherent viscosity (0.5 g./dl.) in tetrahydrofuran was 1.2 dl./gram.

EXAMPLE 7

This example illustrates the preparation of poly(ethylene 2,2'-bis(trifluoromethyl)-4,4'-biphenyl dicarboxylate) by the high-temperature melt polycondensation of ethylene glycol and dimethyl 2,2'-bis(trifluoromethyl)-4,4'-biphenyl dicarboxylate.

In a ten-ml. two-necked pear-shaped flask (equipped with a drawn glass capillary tube leading through the smaller neck to the bottom of the flask and a column connected to a bubbler on the larger neck), was added one gram of dimethyl 2,2'-bis(trifluoromethyl)-4,4'-biphenyl dicarboxylate; one ml. of ethylene glycol; one mg. of calcium acetate monohydrate; and one mg. of antimony trioxide. The flask was heated in a 150° C. oil bath while argon was slowly bubbled through the capillary tube into the two-phase melt. After one hour, the mixture became a clear single phase. The temperature was slowly raised to 180° C. while bubbling was continued for 16 hours. The column was then replaced with a slow nitrogen sweep at the mouth of the larger neck as the temperature was slowly raised to 210° C. When most of the excess ethylene glycol had distilled out, the larger neck was connected to a vacuum pump through a needle valve and vacuum was slowly applied as the temperature was raised to 230° C. Argon flow through the capillary was restricted by a pinch clamp on the rubber supply tube, and after an additional one hour, full pump vacuum was applied to the flask. The temperature was then slowly raised to 260° C. and the pinch clamp was gradually opened as the polymeric reaction mass thickened. After an additional two hours at 260° C., the clamp was closed and the polymer was held at 200° C. under full pump vacuum for an additional 18 hours. The entire procedure required about 42 hours. Upon cooling, a pale yellow, tough, bubbly polymer resulted. The polymer was dissolved in acetone, precipitated in hexane to provide a chunk-like material, redissolved in acetone, precipitated in water to provide a fine powder and was redissolved in and freeze-dried from benzene. After drying overnight under vacuum, the resulting white foamed polymer weighed 946 mgs. (95% yield).

Elemental analysis for $C_{18}H_{10}F_6O_4$ provided the following:

|  | % C | % H | % F |
|---|---|---|---|
| Calculated: | 53.48 | 2.49 | 28.20 |
| -continued |  |  |  |
|  | % C | % H | % F |
| Found: | 53.40 | 2.56 | 28.31 |

The polymer contained recurring units of the formula

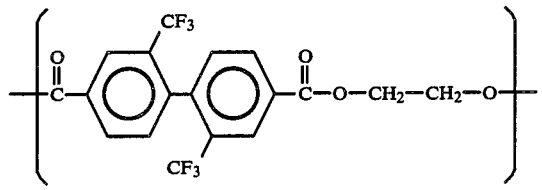

The polymer softened at 130° C. on a Fisher-Johns melting point apparatus. Polymer flow improved upon application of pressure by hand at a temperature of 200° C. Thermogravimetric analysis showed that the onset of decomposition in nitrogen occurred at 380° C. Differential scanning calorimetry detected a reproducible transition at about 120° C. Thermomechanical analysis also showed a softening temperature at about 115° C.

Inherent viscosity (0.5 dl./g.) in acetone was 0.20 dl./gram; in a 3/2 phenol/TCE solvent mixture, it was 0.28 dl./gram.

The refractive index and Abbe number for an isotropic film cast from acetone and measured on an Abbe refractometer were, respectively, n=1.5218 and ν=29. The parallel and perpendicular refractive indices of a fiber pulled from a polymer melt were respectively 1.546 and 1.507.

What is claimed is:

1. The compound having the formula

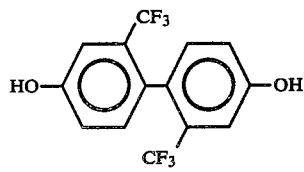

* * * * *